United States Patent
Khan et al.

(10) Patent No.: US 9,754,323 B2
(45) Date of Patent: Sep. 5, 2017

(54) RULE BASED EXCHANGE SIMULATOR

(71) Applicant: Bank of America Corporation, Charlotte, NC (US)

(72) Inventors: Rehman Ahmed Khan, East Windsor, NJ (US); Srinivasa Rao Aravala, AndhraPradesh (IN); Suhas Prakash Shahapurkar, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 582 days.

(21) Appl. No.: 13/943,319

(22) Filed: Jul. 16, 2013

(65) Prior Publication Data

US 2015/0025873 A1 Jan. 22, 2015

(51) Int. Cl.
*G06F 9/44* (2006.01)
*G06Q 40/06* (2012.01)

(52) U.S. Cl.
CPC .................................... *G06Q 40/06* (2013.01)

(58) Field of Classification Search
CPC ...................................................... G06Q 40/06
USPC ......................................................... 703/21
See application file for complete search history.

(56) References Cited

U.S. PATENT DOCUMENTS

| | | | | |
|---|---|---|---|---|
| 7,716,120 B2* | 5/2010 | Driscoll | ................ | G06Q 40/00 705/35 |
| 7,747,516 B2* | 6/2010 | Driscoll | ................ | G06Q 40/00 705/35 |
| 7,769,675 B2* | 8/2010 | Driscoll | ................ | G06Q 40/00 705/35 |
| 8,484,122 B2* | 7/2013 | Claus | ..................... | G06Q 40/00 705/37 |
| 2002/0087455 A1* | 7/2002 | Tsagarakis | ........... | G06Q 20/382 705/37 |
| 2002/0156716 A1* | 10/2002 | Adatia | ................. | G06Q 40/025 705/37 |
| 2004/0064395 A1* | 4/2004 | Mintz | ..................... | G06Q 40/06 705/37 |
| 2005/0228741 A1* | 10/2005 | Leibowitz | .............. | G06Q 40/06 705/37 |

(Continued)

OTHER PUBLICATIONS

Chou et al. ("A Rule-based Neural Stock Trading Decision Support System", ResearchGate, 1996, pp. 148-154).*

(Continued)

*Primary Examiner* — Omar Fernandez Rivas
*Assistant Examiner* — Iftekhar Khan
(74) *Attorney, Agent, or Firm* — Banner & Witcoff, Ltd.; Michael A. Springs

(57) ABSTRACT

Methods, systems, and computer-readable media for providing a rule based exchange simulator are presented. A plurality of rules may be received at an exchange simulator that define how orders should be processed at the exchange simulator. The received rules may be stored, for instance, at a rules engine. For example, rules may comprise a fill rule, a cancel rule, a reject rule, a no acknowledgment rule, and a market data rule. An order that comprises a stock exchange order may be received at the exchange simulator. For example, an order may comprise a buy or sell order for a particular instrument, such as a stock, and may comprise a particular quantity. Based on the one or more rules stored in the rules engine, the received order may be fully filled, partially filled, or not filled.

20 Claims, 9 Drawing Sheets

(56) References Cited

U.S. PATENT DOCUMENTS

| | | | | |
|---|---|---|---|---|
| 2007/0027797 A1* | 2/2007 | Claus | G06Q 40/04 | 705/37 |
| 2007/0208657 A1* | 9/2007 | Petrino | G06Q 40/06 | 705/37 |
| 2008/0109351 A1* | 5/2008 | Colaio | G06Q 20/10 | 705/39 |
| 2008/0172319 A1* | 7/2008 | Bartko | G06Q 40/04 | 705/37 |
| 2008/0243572 A1* | 10/2008 | Amos | G06Q 10/10 | 705/7.29 |
| 2008/0313095 A1* | 12/2008 | Shalen | G06Q 40/00 | 705/36 R |
| 2009/0037320 A1* | 2/2009 | Tully | G06Q 40/00 | 705/37 |
| 2009/0063326 A1* | 3/2009 | Matsushima | G06Q 40/04 | 705/37 |
| 2009/0132335 A1* | 5/2009 | Pein | G06Q 10/04 | 705/7.29 |
| 2009/0276349 A1* | 11/2009 | Lutnick | G06Q 40/00 | 705/37 |
| 2010/0057626 A1* | 3/2010 | Lutnick | G06Q 20/10 | 705/80 |
| 2010/0094744 A1* | 4/2010 | Van Slyke | G06Q 40/04 | 705/37 |
| 2010/0138360 A1* | 6/2010 | Cutler | G06F 3/0481 | 705/36 R |
| 2010/0218108 A1* | 8/2010 | Crabtree | G06Q 50/06 | 715/738 |
| 2010/0306096 A1* | 12/2010 | Gorman | G06Q 40/04 | 705/37 |
| 2010/0332368 A1* | 12/2010 | Alderucci | G06Q 40/04 | 705/37 |
| 2011/0040670 A1* | 2/2011 | Highland | G06Q 10/04 | 705/37 |
| 2011/0153520 A1* | 6/2011 | Jeng | G06Q 40/06 | 705/36 R |
| 2012/0005062 A1* | 1/2012 | Lutnick | G06Q 40/04 | 705/37 |
| 2013/0191185 A1* | 7/2013 | Galvin | G06Q 30/01 | 705/7.37 |

OTHER PUBLICATIONS

Wang et al. ("Stock Trading Decision Support System Using a Rule Selector Based on Sliding Window", IEEE, 1997, pp. 559-564).*
Subramanian Ramamoorthy ("A strategy for stock trading based on multiple models and trading rules", 2003, CS 395T Project Report, pp. 1-16).*

* cited by examiner

FIG. 8

RULE BASED EXCHANGE SIMULATOR

FIELD

Aspects of the disclosure relate to computer hardware and software. In particular, one or more aspects of the disclosure generally relate to computer hardware and software that can be used to provide a rule based exchange simulator, such as systems and methods for processing orders received at an exchange simulator based on a plurality of rules.

BACKGROUND

Financial management has become more complex over time. For instance, the financial services industry has grown exponentially in recent years. Based on this increase, and due to an increase in sophistication of financial institutions, investment strategies have become increasingly comprehensive. In addition, conditions that affect stock market exchanges can be difficult to predict and, because of this, it may be difficult to determine an effective financial portfolio strategy. As a result, a way to provide a simulated market exchange may be beneficial. Accordingly, there is a need for systems and method addressing one or more of these shortcomings.

SUMMARY

Aspects of the disclosure provide various techniques that enable a rule based exchange simulator, which may comprise receiving one or more rules and processing orders based on the rules.

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Methods, systems, and computer-readable media for providing a rule based exchange simulator are described according to various embodiments. A plurality of rules may be received at an exchange simulator that define how orders should be processed at the exchanged simulator. The received rules may be stored, for instance, at a rules engine. For example, rules may comprise a fill rule, a cancel rule, a reject rule, a no acknowledgment rule, and a market data rule. An order that comprises a stock exchange order may be received at the exchange simulator. For example, an order may comprise a buy or sell order for a particular instrument, such as a stock, and may comprise a particular quantity. Based on the one or more rules stored in the rules engine, the received order may be fully filled, partially filled, or not filled.

In an embodiment, a received order may comprise an instrument and a quantity. A fill rule may define that a portion of the quantity for the received order may be filled. Based on the fill rule, the exchange simulator may fill a portion of the order.

In an embodiment, a market data rule may define a price and a variance for an instrument. For example, an order for an instrument may be filled, and the price for the fill may be based on a market data rule that defines the price for the instrument. In another embodiment, the price for an instrument may be based on a price polled from a live market exchange.

In an embodiment, the plurality of rules may configure the exchange simulator to simulate hours of operation for an exchange located in a time zone. In this embodiment, an order may not be filled because the order was received outside the hours of operations for the simulated exchange.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 8 illustrates an example display that comprises an order history according to an embodiment.

DETAILED DESCRIPTION

In the following description of various embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As noted above, certain embodiments are discussed herein that relate a rule based exchange simulator. Before discussing these concepts in greater detail, however, an example of a computing device that can be used in implementing various aspects of the disclosure, as well as an example of an operating environment in which various embodiments can be implemented, will first be described with respect to FIGS. 1A and 1B.

Figure 1A:
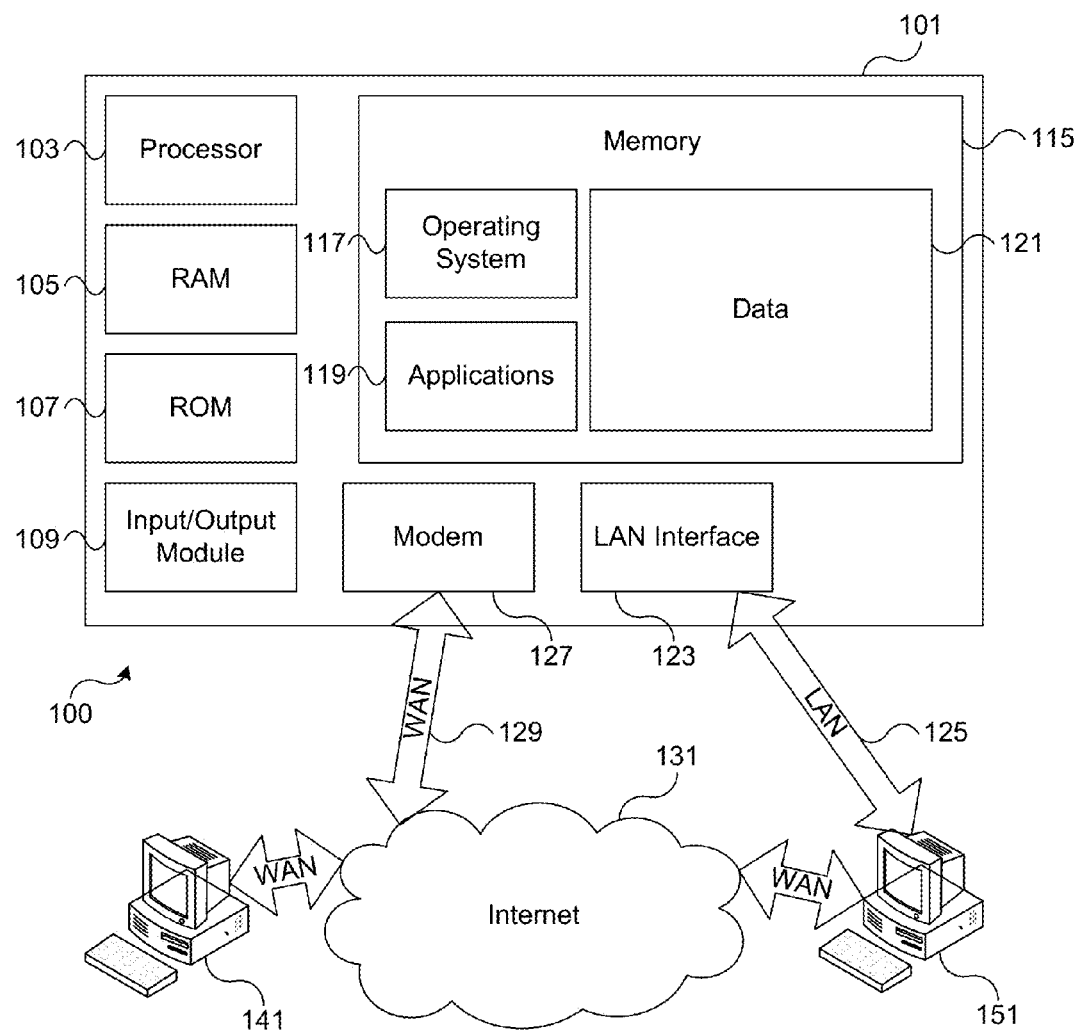
FIG. 1A illustrates an example operating environment according to an embodiment.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and so on) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
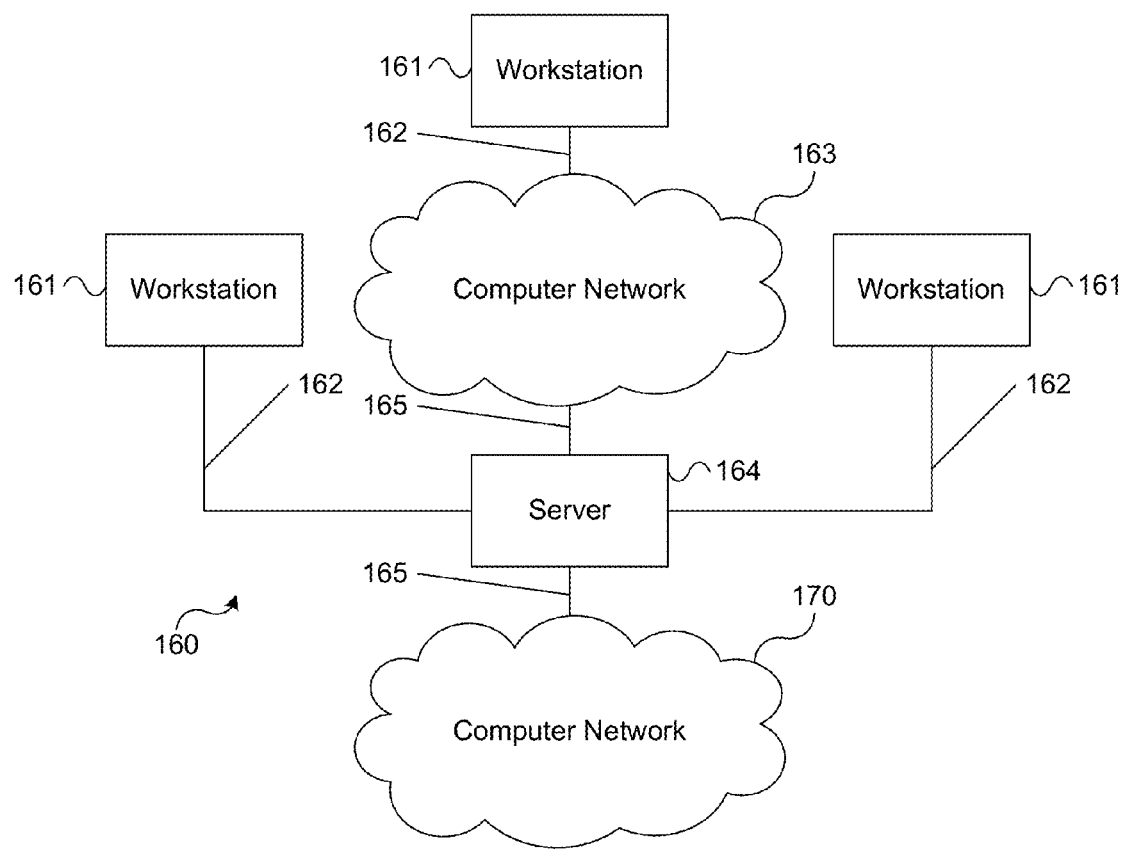
FIG. 1B illustrates another example operating environment according to an embodiment.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and/or the like.

Having described an example of a computing device that can be used in implementing various aspects of the disclosure and an operating environment in which various aspects of the disclosure can be implemented, several embodiments will now be discussed in greater detail.

In an illustrative embodiment, a service provider may provide a simulated exchange to one or more users. For example, a service provider may provide a simulated stock market exchange, such as a simulator that simulates the buying and selling of stocks, for one or more users, and the users may submit orders to the simulated exchange. The orders may comprise buy orders, sell orders, stop orders, and the like. The simulated exchange may process the received orders based on one or more rules received for processing the orders.

Figure 2:
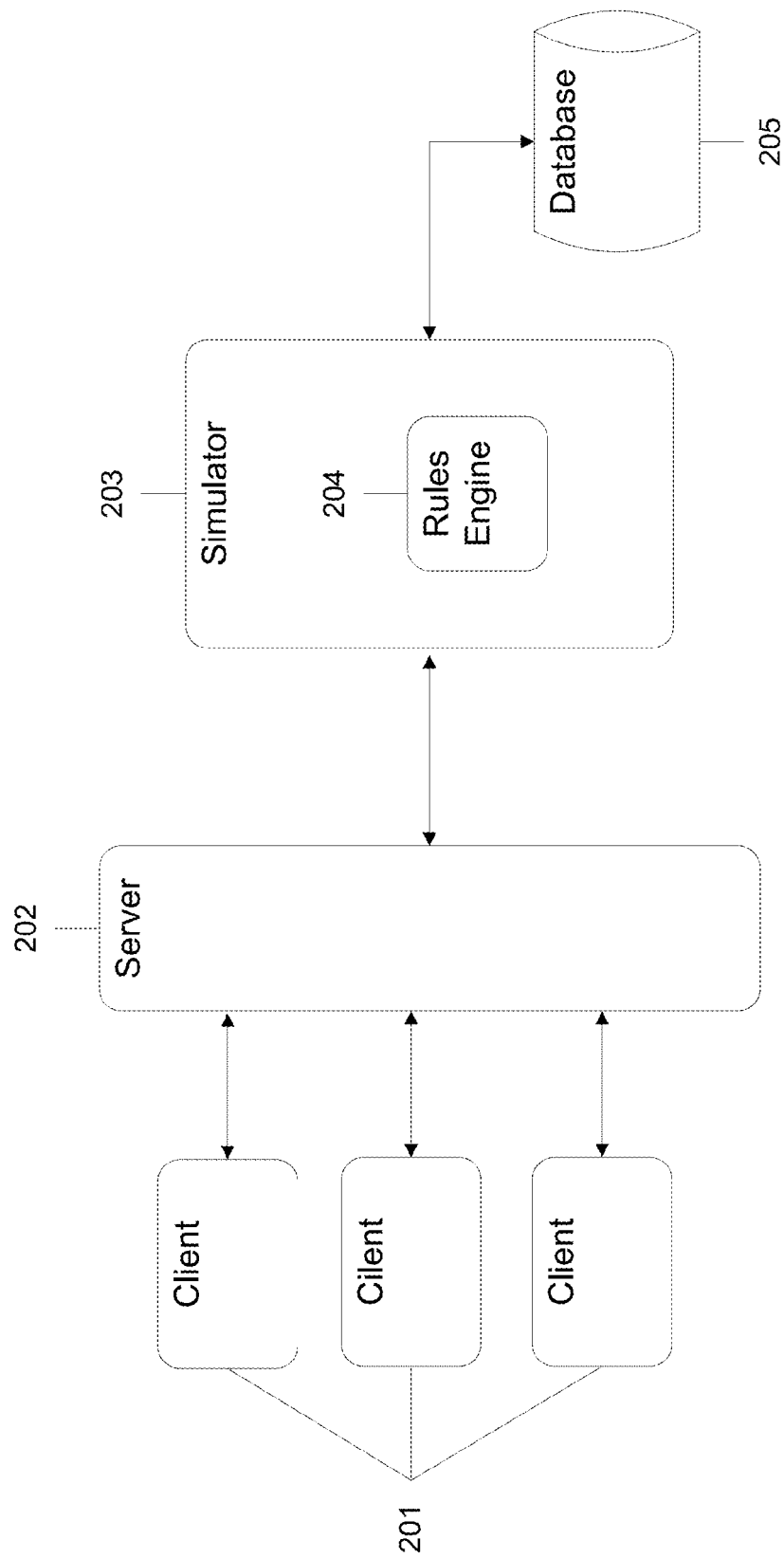
FIG. 2 illustrates a sample system framework used to provide a simulated exchange according to an embodiment.

FIG. 2 illustrates a sample system framework used to provide a simulated exchange according to an illustrative embodiment. The framework of FIG. 2 includes clients 201, server 202, simulator 203, rules engine 204, and database 205. In an embodiment, clients 201 may submit orders to simulator 203 through server 202. For example, server 202 may comprise a gateway server. In an embodiment, clients 201 may comprise a plurality of computing devices. In another embodiment, clients 201 may comprise a plurality of interfaces such that each interface is configured to communicate with server 202 and simulator 203, such as an interface for an Order Management System (OMS).

In an illustrative embodiment, clients 201 may submit orders according to a plurality of messaging protocols. For example, clients 201 may communicate using a Fidessa for Americas Sales Trading system (FAST) protocol, a Financial Information Exchange (FIX) protocol, a Unified Trading System (UTS) protocol, an Asian Multi Market Access system (AMMA) protocol, a Java Enabled Transport System (JETS) protocol, a National Montage System (NMS) protocol, an End of Day system (EOD) protocol, a Global Positing Keeping system (GPK) protocol, an Asia Pacific Region (APR) system protocol, and any other suitable protocol. For instance, clients 201 may comprise a plurality of interfaces that communicate using a plurality of messaging protocols.

In an embodiment, simulator 203 may use a proprietary messaging protocol or any suitable messaging protocol. Server 202 may comprise one or more modules used to transform, translate, and/or abstract received orders from the received messaging protocol into the messaging protocol used by simulator 203. For example, simulator 203 may use a particular messaging protocol, and server 202 may comprise a plurality of modules where the modules are used to transform, translate, and/or abstract an order received according to a messaging protocol (e.g., FAST, FIX, UTS, and the like) into the particular messaging protocol. In this example, server 202 may also comprise a plurality of modules where the modules are used to transform, translate, and/or abstract responses from simulator 203 formatted according to the particular messaging protocol into FAST, FIX, UTS, and the like messaging protocols so that the responses may be routed to clients 201.

In an illustrative embodiment, an order may be submitted to server 202 from one of clients 201, where the order is formatted according to a first messaging protocol. Server 202 may transform, translate, and/or abstract the received order into a second messaging protocol, where simulator 203 communicates using the second messaging protocol. Server 202 may route the transformed, translated, and/or abstracted order to simulator 203. Simulator 203 may process the order and generate a response formatted according to the second messaging protocol. The response may be routed from simulator 203 to server 202. Server 202 may transform, translate, and/or abstract the received response such that the response is formatted according to the first messaging protocol. Server 202 may then route the transformed, translated, and/or abstracted response to the client 201 that submitted the order.

In an embodiment, server 202 may communicate with simulator 203 using various transfer protocols, such as a transfer control protocol (TCP) over an internet protocol (IP), a message queue (MQ) protocol, an Enterprise Messaging System (EMS) protocol, and any other suitable protocol. For example, server 202 may route a received order to simulator 203 using a TCIP/IP protocol, an MQ protocol, an EMS protocol, or any other suitable transfer protocol based on a protocol for a received order.

In an illustrative embodiment, simulator 203 processes received orders according to rules engine 204. For example, rules engine 204 may comprise one or more rules about processing received orders. The rules may be received, for example, from clients 201, from an administrator of simulator 203, or from any other suitable source. In an embodiment, a received order may comprise an order to buy or sell a particular instrument, for instance a stock, for a particular quantity. For example, an order may comprise a buy order for stock XYZ, indicated by a ticker symbol, at a quantity of 500. An example rule in rules engine 204 may comprise a rule to fully fill, partially fill, or not fill an order based on an instrument and a quantity for the received order.

Figure 3:
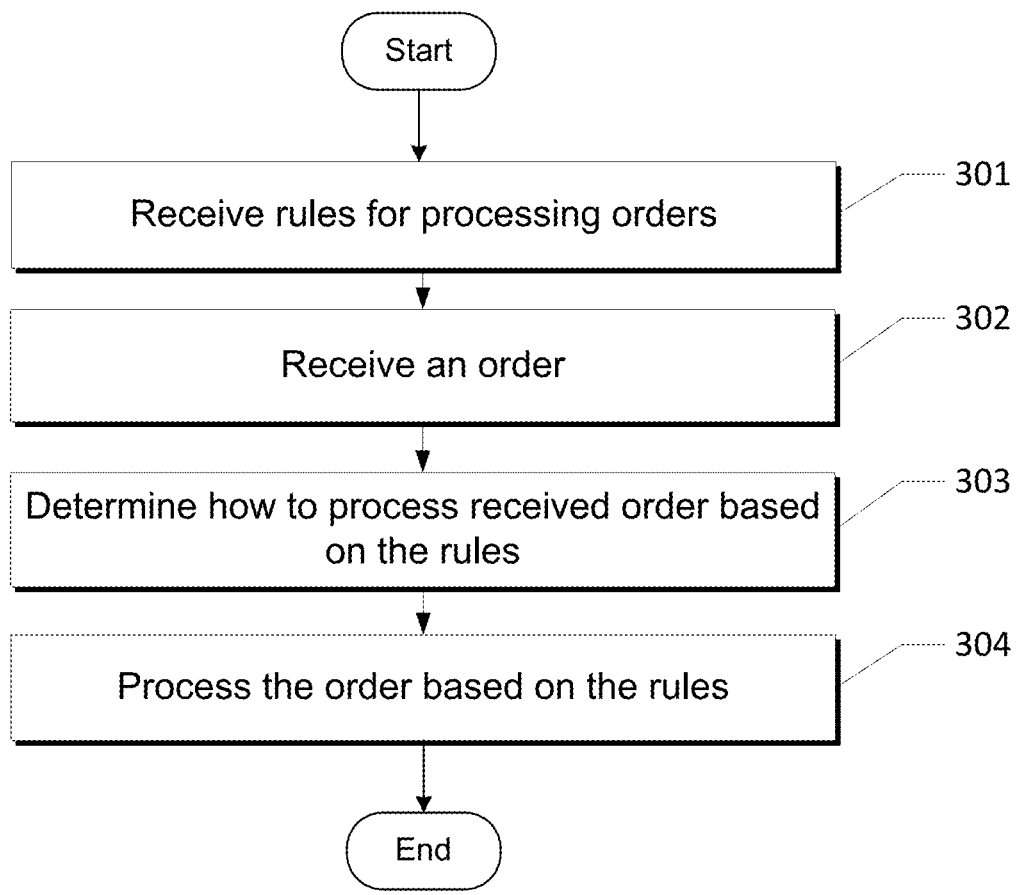
FIG. 3 illustrates an example processes for providing a simulated exchange according to an embodiment.

FIG. 3 illustrates an example method for providing a rule based exchange simulator according to an illustrative embodiment. For example, the framework of FIG. 2 may execute the method of FIG. 3. FIG. 3 may start at step 301, where rules are received for processing orders. For example, the received rules may comprise rules for processing orders at simulator 203. The received rules may be stored in rules engine 204. Step 301 may further comprise the method steps of FIG. 4.

Figure 4:
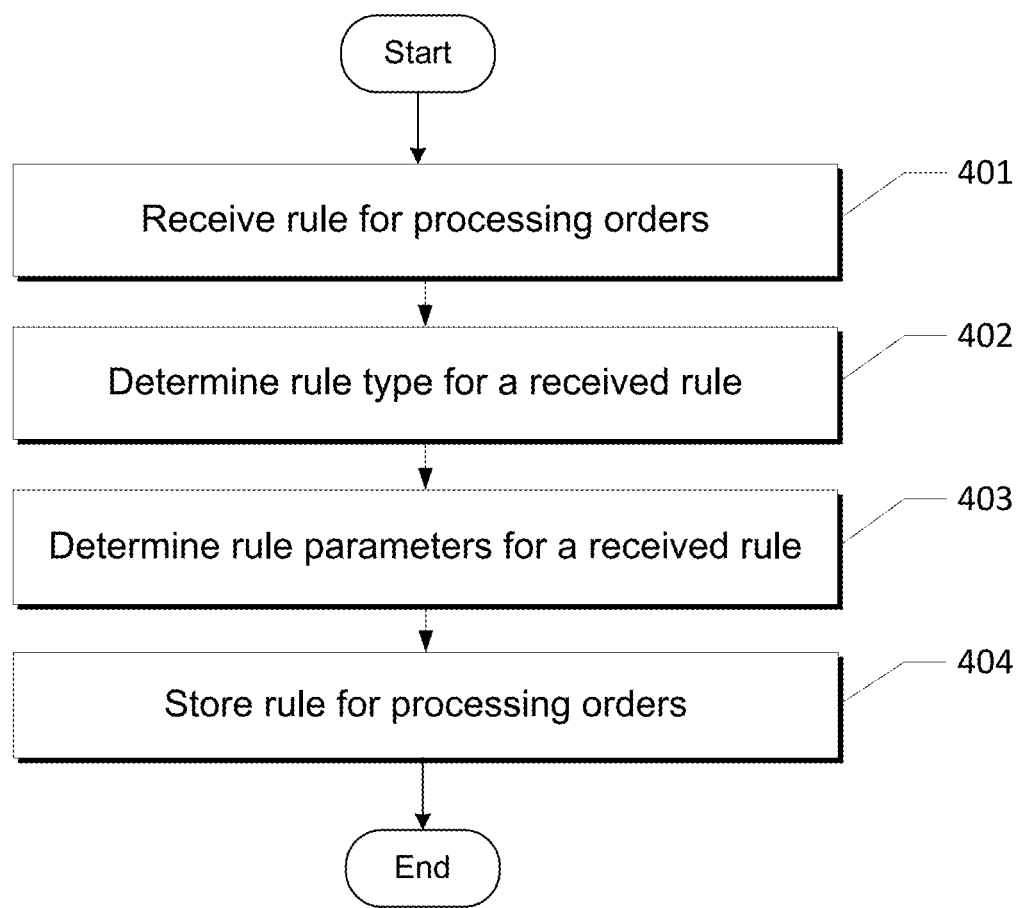
FIG. 4 illustrates an example processes for receiving a rule for a simulated exchange according to an embodiment.

FIG. 4 illustrates an example method for receiving a rule for a rule based exchange simulator according to an illustrative embodiment. FIG. 4 may start at step 401, where a rule for processing orders is received. For example, one or more of clients 201, an administrator for simulator 203, or any other source may submit rules for processing orders. In an embodiment, a user may use an interface to submit rules for simulator 203.

Figure 5:
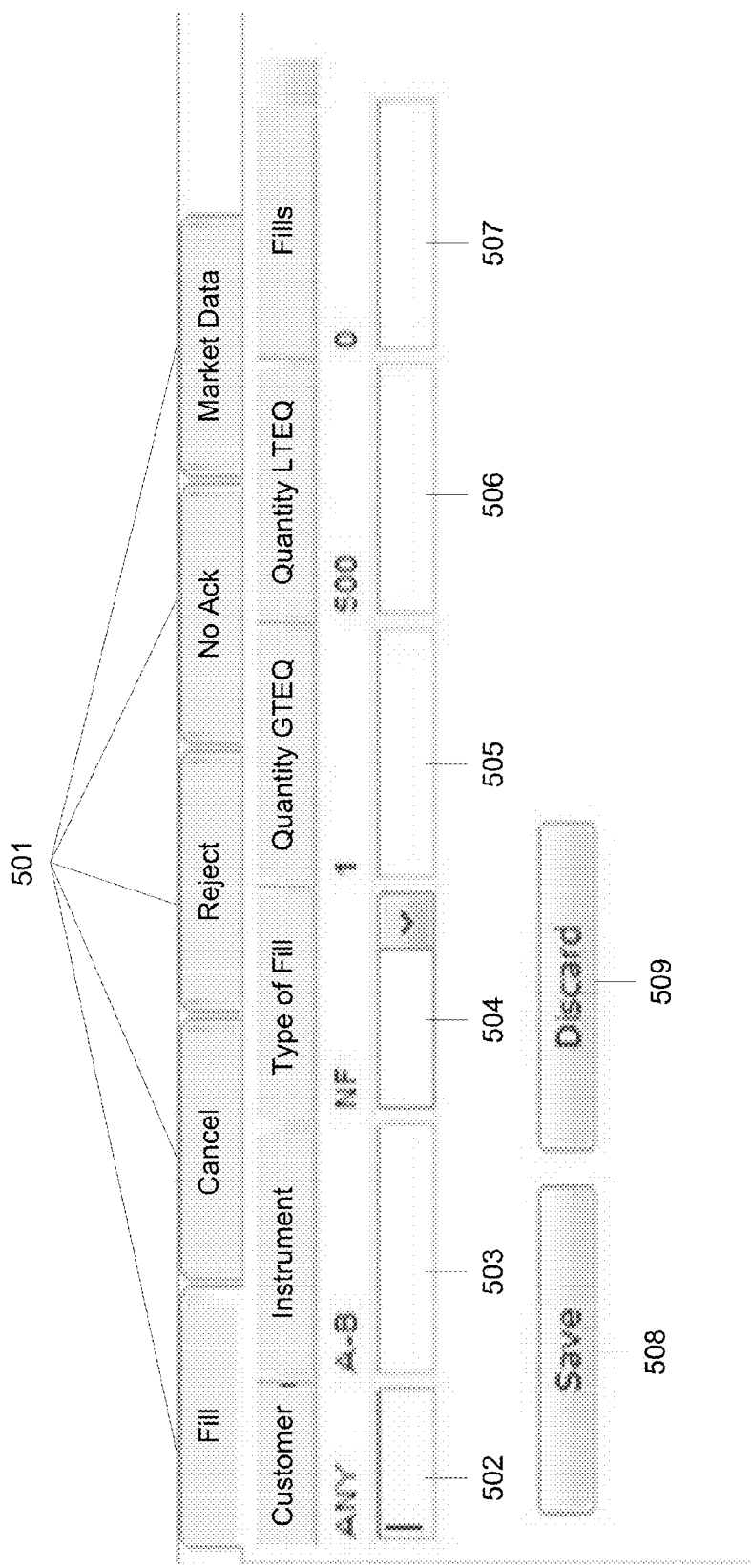
FIGS. 5 and 6 illustrate example interfaces for submitting a rule to a simulator according to an embodiment.

FIG. 5 illustrates an interface that may be used to submit rules for simulator 203 according to an illustrative embodiment. The interface may comprise a web portal, a stand-alone application, an applet, a website, or any other suitable interface and may leverages technologies such as web technologies (e.g., J2EE, .NET, and the like) and any other suitable software technology. FIG. 5 may comprise tabs 501 that indicate a type of rule being defined for the interface. For example, tabs 501 may indicate a fill rule, a cancel rule, a reject rule, a no acknowledgment rule, and a market data rule. When a tab 501 is selected, a user may be guided to an interface for defining the indicated rules. FIG. 5 illustrates an interface for defining a fill rule. A user may input data using the interface illustrated in FIG. 5 to define a fill rule. A fill rule may define the quantity that should be filled for an order, such as the quantity of stock to be bought in a purchase order.

The interface of FIG. 5 may comprise Customer data field 502, Instrument data field 503, Type of Fill data field 504, Quantity Greatest Equal to data field 505, Quantity Least equal to data field 506, and Fills data field 507. Any suitable combination of these data fields may comprise a fill rule for an order. For example, Customer data field 502 may define the customers for a rule. Customer data field 502 may comprise a customer identifier, an identifier for a group of customers, a wildcard such that the rules applies to every customer (e.g., "ANY"), or any other suitable value. Instrument data field 503 may define the instruments for a rule. Instrument data field 503 may comprise a ticker that identifies a stock, a group of tickers that identifies a group of stocks (e.g., "A-B" which would identify all stock tickers that start with A or B, "A-Z" which would identify all stock tickers that start with any letter in the alphabet, and the like), a wildcard such that the rules applies to every instrument, or any other suitable value. Type of Fill data field 504 defines the type of fill for an order. Type of Fill data field may comprise not fill, partial fill, and fully fill.

In an illustrative example, Quantity Greatest Equal data field 505 and Quantity Least Equal data field 506 define a range for a quantity, where Fills data field 507 defines a number of fills for that quantity. For example, where a rule comprises a not fill "Type of Fill," a range defined by data fields 505 and 506 may comprise quantities 1-500 and a fill defined by data field 507 may comprise 0. In this example, the rule would define that none of the quantity for an order should be filled. In another illustrative example, where a rule comprises a partial fill "Type of Fill," a range defined by data fields 505 and 506 may comprise quantities 501-1000 and a fill defined by data field 507 may comprise 500. In this example, the rule would define that 500 of the quantity for an order should be filled.

Once a user enters data into data fields 502-507, or any combination of these, button 508 may be selected to save the inputted rule. Button 509 may be selected to discard an inputted rule.

In an illustrative embodiment, an interface for defining a cancel rule corresponding to Cancel tab 501 may be similar to the interface illustrated in FIG. 5. A cancel rule may define a quantity of accepted fills to be cancelled. A cancel rule may comprise a Customer data field, an Instrument data field, and a Quantity to Cancel data field. The Customer data field and Instrument data field may be similar to the data fields described above. The Quantity to Cancel data field may define the quantity of accepted fills to be cancelled. For example, at a simulator, a first quantity of fills may be accepted for a particular instrument, and a cancel rule may be defined for the particular instrument with a second quantity. In this example, if the first quantity is greater than the second quantity, a second quantity of accepted fills would be canceled based on the rule, and if the second quantity is greater than or equal to the first quantity, all of the first quantity of accepted fills would be canceled based on the rule.

In an embodiment, an interface for defining a reject rule corresponding to Reject tab 501 may be similar to the interface illustrated in FIG. 5. A reject rule may define a quantity to be rejected in an order. A reject rule may comprise a Customer data field, an Instrument data field, and a Quantity to Reject data field. The Customer data field and Instrument data field may be similar to the data fields described above. The Quantity to Reject data field may define the quantity to be rejected for an order. For example, at a simulator, a buy order for a particular instrument with a first quantity may be received, and a reject rule may be defined for the particular instrument with the first quantity. In this example, the entire quantity for the order would be rejected based on the rule.

In an illustrative embodiment, an interface for defining a no acknowledgment rule corresponding to No Acknowledgment tab 501 may be similar to the interface illustrated in FIG. 5. A no acknowledgment rule may define one or more instruments not to be acknowledged. A no acknowledgment rule may comprise a Customer data field and an Instrument data field. The Customer data field and Instrument data field may be similar to the data fields described above. For example, at a simulator, a buy order for a particular instrument may be received, and a no acknowledgment rule may be defined for the particular instrument. In this example, the simulator would not send an acknowledgment about the order based on the rule.

Figure 6:
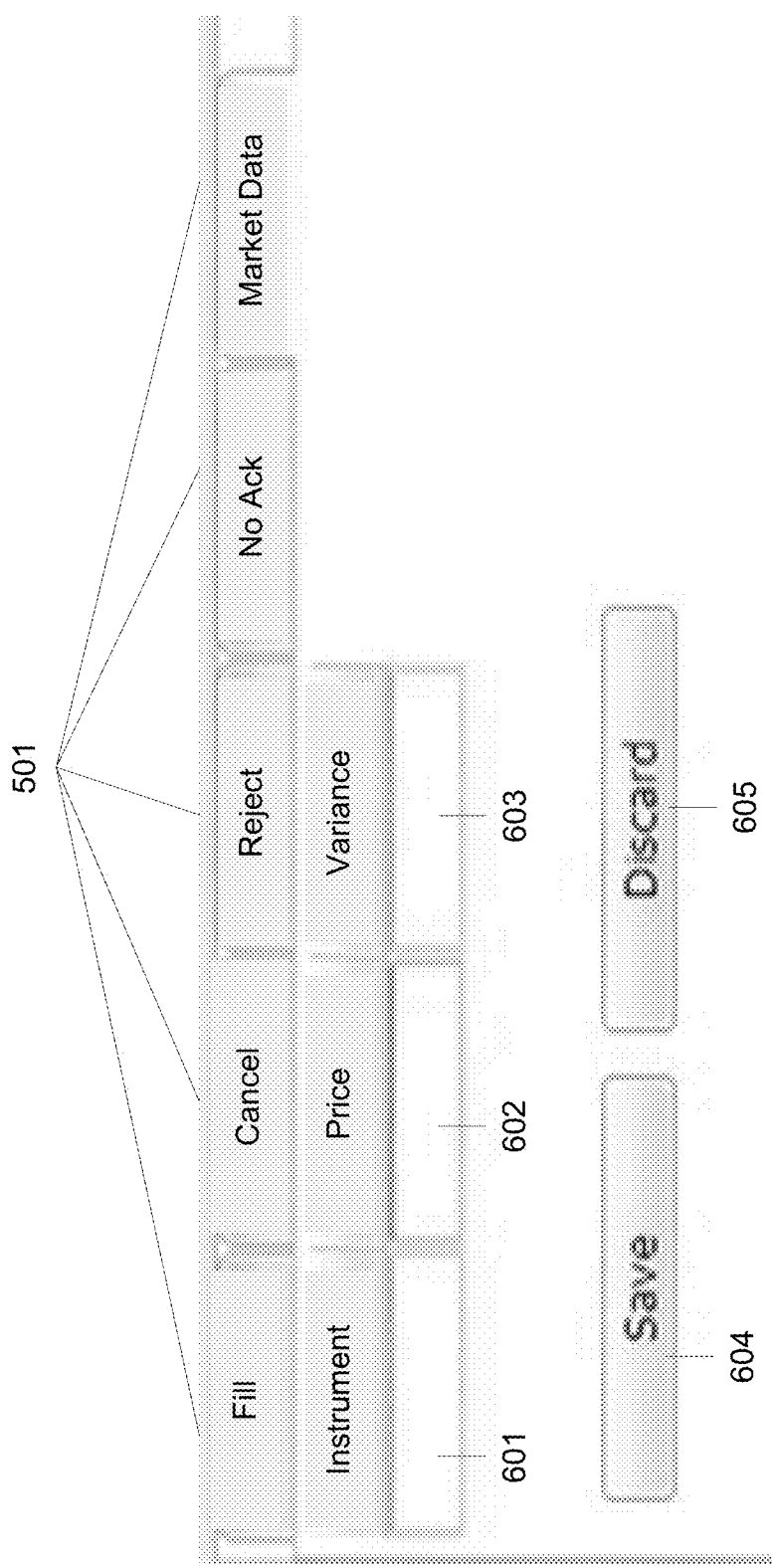

In an illustrative embodiment, an interface for defining a market data rule corresponding to Market Data tab 501 may be similar to the interface illustrated in FIG. 5. FIG. 6 illustrates an example interface for defining a market data rule according to an embodiment. The interface may comprise a web portal, a stand-alone application, an applet, a website, or any other suitable interface and may leverages technologies such as web technologies (e.g., J2EE, .NET, and the like) and any other suitable software technology. A market data rule may define data, such as the price, for an instrument, such as a stock. The interface of FIG. 6 may comprise Instrument data field 601, Price data field 602, and Variance data field 603. Instrument data field 601 may be similar to the Instrument data field described above. Price data field 602 may comprise a price for one or more instruments, such as a price for a stock. Variance data field 603 may comprise a variance for the price, such as a price fluctuation. For example, a market data rule may define 20 as the price for a particular instrument, such as a stock identified by a ticker, and 5 as the variance. In this example, when an order is processed for the instrument, the price for the instrument may be a randomly selected value between 15 and 25 (i.e., between (20−5) and (20+5). Accordingly, the price for the instrument may fluctuate over time. Once a user enters data into data fields 601-603, or any combination of these, buttons 604 and 605 may operate similar to buttons 508 and 509, as described above.

The method of FIG. 4 may proceed from step 401 to step 402, where a rule type for a received rule is determined. For example, a rule type may comprise a fill rule, a cancel rule, a reject rule, a no acknowledgment rule, a market data rule, or any other suitable rule type. The process of FIG. 4 may proceed from step 402 to step 403, where rule parameters may be determined. For example, for a particular rule type, rule parameters may be determined. In an embodiment, a received rule may comprise a fill rule, and the rule parameters may comprise customer data, instrument data, type of fill data, quantity greatest equal to data, quantity least equal to data, fills data, or any combination of these. Similar parameters may be determined for a cancel rule, a reject rule, a no acknowledgment rule, or a market data rule, as described above.

The method of FIG. 4 may proceed from step 402 to step 403, where the rule may be stored for processing orders. For example, the rule may be stored in rules engine 204.

The method of FIG. 3 may proceed from step 301 to step 302, where an order may be received. For example, an order may comprise a buy order or a sell order for a particular instrument, such as a particular stock ticker, and a particular quantity. In an embodiment, a buy order may be received for ticker XYZ and the quantity 1000. When an order is received, an acknowledgment message may be sent to a client that submitted the order according to an embodiment. An order may be received from one or more clients 201.

The process of FIG. 3 may proceed from step 302 to step 303, where it is determined how to process the received order based on the rules. For example, one or more rules may be stored in rules engine 204 that apply to the received order. In an embodiment, a market data rule may define a price and a variance for ticker XYZ, and a price for the order may be based on the market data rule. In another embodiment, a fill rule may define a partial fill for the order, where the fill rule defines that an order for instrument XYZ with a quantity 501 and 1000 should fill a quantity of 500 for the order.

The process of FIG. 3 may proceed from step 303 to step 304, where the order is processed based on the rules. For example, for a buy order for stock ticker XYZ and the quantity 1000, a price may be set based on a market data rule. In another example, a fill may be processed based on a fill rule. In an embodiment, a partial fill for 500 of the 1000 quantity for the order may be filled based on a fill rule. Accordingly, simulator 203 may fill 500 of the 1000 quantity for the buy order and leave 500 of the quantity unfilled. In this embodiment, a message may be sent to the client that requested the order informing the client about the partial fill.

The following may illustrate an example of the process of FIG. 3 according to an illustrative embodiment. Simulator 203 may receive four rules, as described above. A first rule may comprise a market data rule that defines a price for stock ticker XYZ should be 25 and a variance should be 5. A second rule may comprise a fill rule that defines an order with a quantity between 0 and 500 for stock ticker XYZ should not be filled. A third rule may comprise a fill rule that defines an order with a quantity between 501 and 1000 for stock ticker XYZ should be partially filled for 500 quantity of the order. A fourth rule may comprise a fill rule that defines an order with a quantity between 1001 and 2500 for stock ticker XYZ should be fully filled. These described rules may be stored in rules engine 204.

Simulator 203 may receive an order from one of clients 201, for instance, via server 202. The order may comprise a buy order for stock ticker XYZ with the quantity 500. In an embodiment, simulator 203 may access rules engine 204 and determine that the second rule, as described above, should apply to the received order. Based on the second rule, simulator 203 may process the order such that none of the 500 quantity is filled. Simulator 203 may send a message to the client 201 that submitted the order indicating the fill status.

In an embodiment, the client 201 that submitted the previous order may submit an amended order. As such, the amended order may be a buy order for stock ticker XYZ with the quantity 1000. In an illustrative embodiment, simulator 203 may access rules engine 204 and determine that the third rule, as described above, should apply to the amended order. Based on the third rule, simulator 203 may fill a quantity of 500 for the order and leave the remaining quantity unfilled. In an illustrative embodiment, simulator 203 may access rules engine 204 and determine that the first rule, as described above, should also apply to the amended order. Based on the first rule, a fill price may comprise 27 for the 500 quantity filled (i.e., base price 25+ variance 2). Simulator 203 may send a message to the client 201 that submitted the order indicating the fill status and the price.

In an illustrative embodiment, simulator 203 may receive another order from one of clients 201, for instance, via server 202. The additional order may be a buy order for stock ticker XYZ with the quantity 2500. In an illustrative embodiment, simulator 203 may access rules engine 204 and determine that the fourth rule, as described above, should apply to the amended order. Based on the fourth rule, simulator 203 may fully fill the quantity of 2500 for the order. In an embodiment, simulator 203 may access rules engine 204 and determine that the first rule, as described above, should also apply to the order. Based on the first rule, a fill price may comprise 29 for the 2500 quantity filled (i.e., base price 25+variance 4). Simulator 203 may send a message to the client 201 that submitted the additional order indicating the fill status and the price.

Figure 7:
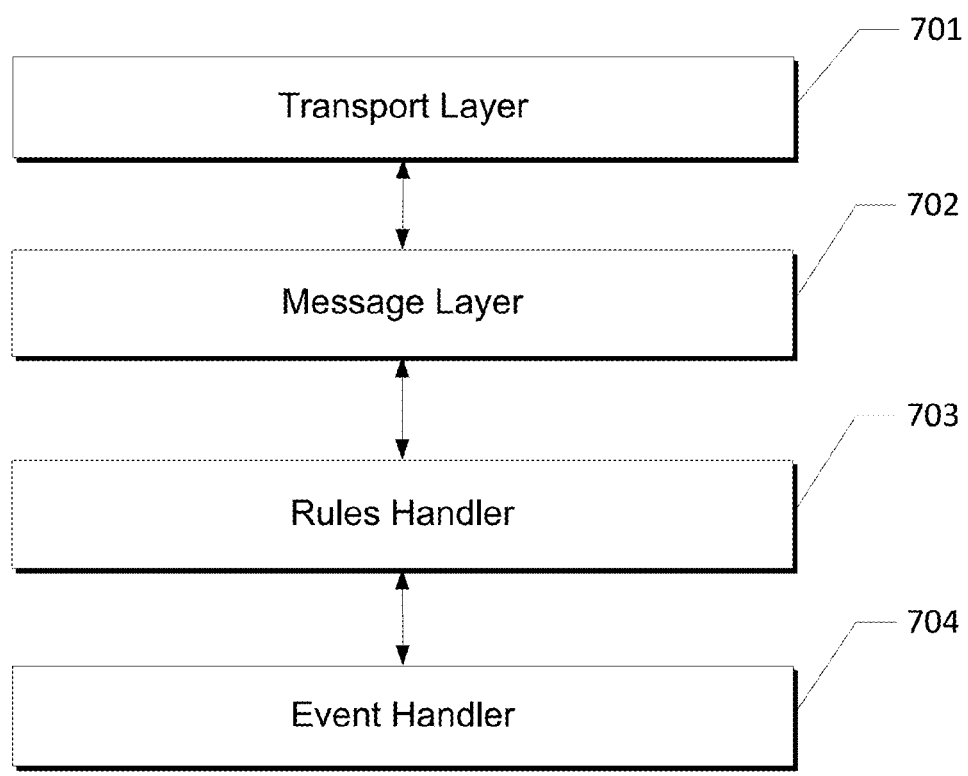
FIG. 7 illustrates an example flow for receiving an order at a simulated exchange according to an embodiment.

FIG. 7 illustrates an example flow for processing orders at a simulated exchange according to an illustrative embodiment. For example, data that comprises an order may be received at simulator 203 and the data may be processed according to the flow illustrated in FIG. 7. The flow of FIG. 7 comprises transport layer 701, message layer 702, rules handler 703, and event handler 704. In an embodiment, the data received at simulator 203 may be received at transport layer 701. Transport layer 701 may process the data according to a transport protocol (e.g., TCP//IP, MQ, and the like) for the data, and a result of the processing may be a message formatted according to a message protocol (e.g., FIX, FAST, and the like). The resultant message may be processed by message layer 702. Message layer 702 may process the message according to message protocol for the message, and a result of the processing may be an order. For example, the order may comprise a type for the order, such as a buy, sell, stop, or any other suitable type, a quantity for the order, an instrument for the order, such as a stock ticker, a price for the order, any combination of these, or any other suitable order parameters. The order may be processed by rules handler 703. Rules handler 703 may determine one or more rules should apply to the received order. The one or more rules may comprise fill rules, cancel rules, reject rules, no acknowledgment rules, market data rules, or any other suitable rules. Event handler 704 may process the order based on the rules determined at rules handler 703. For example, a fill rule may be determined, and event handler 704 may fill a portion or all of a quantity for the order based on the fill rule. In another example, a market data rule may define a price for a fill of a quantity for the order and event handler 704 may assign a price to a fill for the order based on the market data rule. In an embodiment, event handler 704 may send one or more messages to a client that transmitted the request based on the processing at event handler 704.

Figure 8:
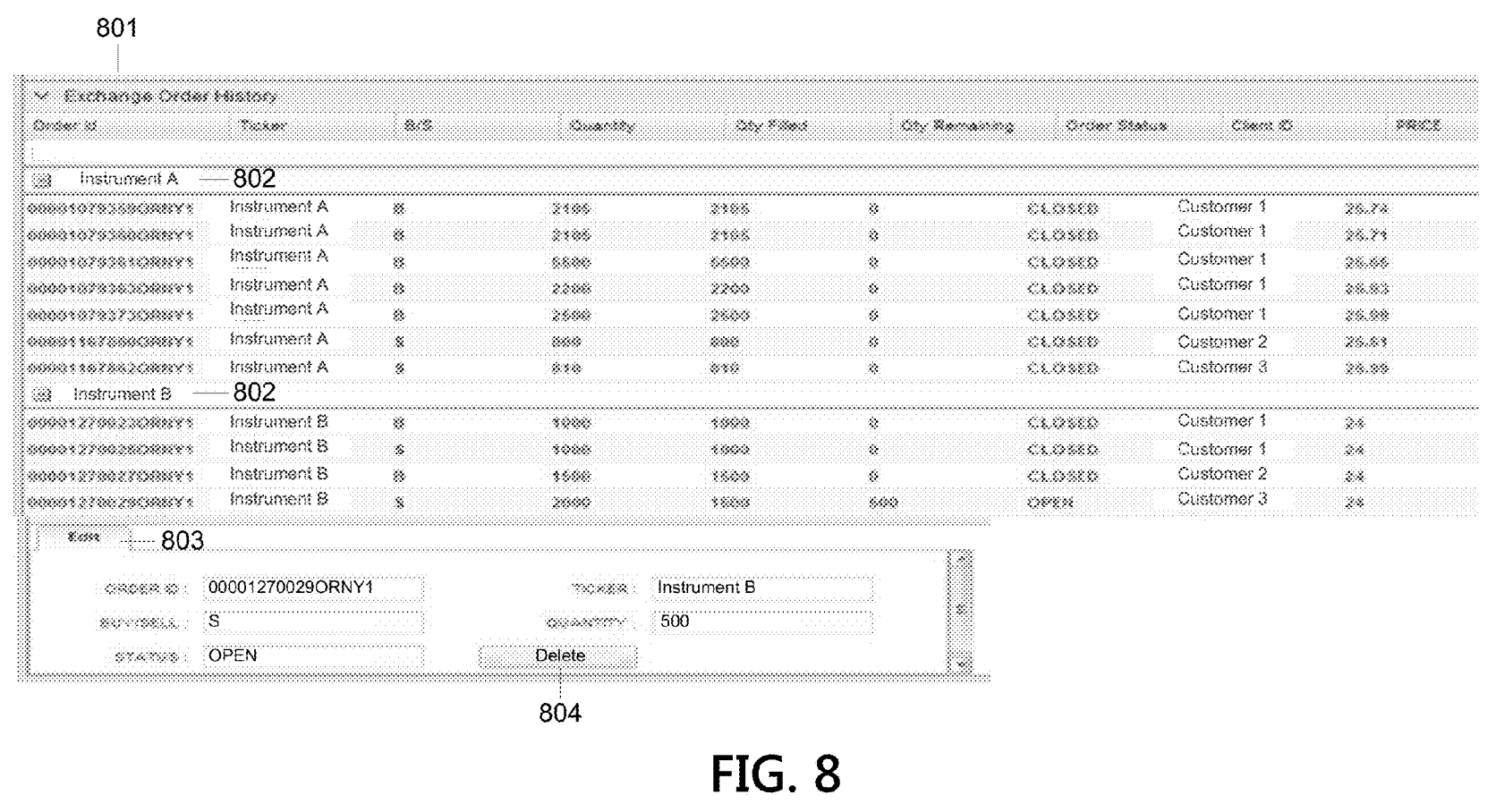

In an embodiment, the order processed by a simulator, such as simulator 203, may be logged, and an order history may be displayed. FIG. 8 illustrates an example display that comprises an order history according to an illustrative embodiment. For example, a simulator, such as simulator 203, may receive one or more orders that comprise stock exchange orders, and the simulator may process the received orders, as described above. Order history 801 may display the orders processed by simulator 203. In an embodiment, the displayed order history may be grouped based on an instrument for the orders. For example, order history 801 comprises orders grouped by instruments 802 (e.g., Instrument A and Instrument B).

In an embodiment, the orders displayed in the order history may include an order ID, a ticker, a buy or sell status, a quantity requested, a quantity filled, a quantity remaining, an order status, a client ID, a price, any combination of these, and any other suitable element. An order ID may comprise a unique identification string for an order. A ticker may comprise an instrument for an order. A buy or sell status may indicate whether the order was a buy or a sell. A quantity requested may comprise the quantity requested in the order. A quantity filled may comprise the actual quantity filled, for example part or all of the quantity requested, for an order. A quantity remaining may comprise a difference between the quantity requested and the quantity filled. An order status may indicate whether the order has been fully performed (i.e., closed) or remains unperformed (i.e., open). For example, the order displayed in order history 801 with the order ID 00001270029ORNY1 comprises an order status of OPEN because the order includes a quantity remaining of 500. A client ID may comprise an ID for the client that submitted the order. A price may comprise the price that was used to fill the order.

In an embodiment, interface 803 may be used to cancel a processed order. For example, one or more orders may be selected from order history 801. Based on the selection, the order details (e.g., order ID, buy or sell status, order status, ticker, request quantity, and the like) may be displayed by interface 803. Cancel button 804 may be selected to cancel the order. A canceled order may be deleted from the order history, and the order may be reversed by simulator 203. In an embodiment, an order may be selected by any other suitable means, such as by inputting an order ID into interface 803.

In an embodiment, interface 803 may be used to cancel the remaining portion of an order with an open order status. For example, one or more orders that comprise an open order status may be selected from order history 801. Based on the selection, the order details (e.g., order ID, buy or sell status, order status, ticker, remaining quantity, and the like) may be displayed by interface 803. Cancel button 804 may be selected to cancel the remaining portion of the order. In an example, the order corresponding to order ID 00001270029ORNY1 may be selected. In this example, the 500 quantity remaining for the order may be canceled. Accordingly, in this example, the 500 quantity remaining may be canceled, but the 1500 quantity filled may remain filled. In an embodiment, an order may be selected by any other suitable means, such as by inputting an order ID into interface 803.

In an illustrative embodiment, one or more rules may be received at simulator 203 such that the simulator may simulate market hours for an exchange. For example, an exchange may be open from 9:00 am to 4:00 pm, or during normal business hours, for various time zones. Accordingly, market hours for exchanges located in different time zones may differ. Based on a set of rules, for example, fill rules, cancel rules, reject rules no acknowledgment rules, and market data rules, simulator 203 may simulate the market hours for an exchange located in a particular time zone. For instance, simulator 203 may process orders from 9:00 am to 4:00 pm for a particular time zone. In an illustrative embodiment, a plurality of simulators 203 may operate to simulate a plurality of exchanges in a plurality of time zones. For instance, simulator 203, or a plurality of simulators, may simulate a plurality of exchanges in a plurality of time zones, and market hours may be simulated for each exchange such that orders are processed during market hours, for example from 9:00 am to 4:00 pm, for that exchange.

In an illustrative embodiment, a price for one or more instruments, e.g., stocks, may be derived from live market data. For example, one or more live exchanges may be polled, and market data may be pulled for stocks traded by the one or more exchanges. The market data may be stored, for example, in database 205. The market data stored in database 205 may be updated after a predetermined period of time, such as 1 minute, 5 minutes, 10 minutes, an hour, or any other suitable time. The market data may be updated by polling the one or more exchanges to pull updated data.

In an illustrative embodiment, simulator 203 may simulate a live exchange that is not operational (i.e., during a time when the exchange is closed) using one or more market data rules for the instruments traded by the exchange. For example, one or more market data rules may define a price for instruments traded by the exchange. In this example, a price may be defined for an instrument even though the exchange that trades the instrument is closed.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A computer implemented method, comprising:
receiving, by an exchange simulator having at least one processor, a plurality of rules, wherein the rules comprise rules to process orders received at the exchange simulator;
storing, by a rules engine of the exchange simulator, the plurality of rules;
receiving, via a server of the exchange simulator, a plurality of orders from a client, each order of the plurality of orders being received via a different messaging protocol, wherein at least a first order of the plurality of orders comprises an exchange order that includes an instrument;
transforming, by the server, the received plurality of orders from the received messaging protocol of the respective order to a first messaging protocol different from the received messaging protocol of the respective order, the first messaging protocol being a proprietary messaging protocol used by the exchange simulator;
identifying, from the rules engine, one or more rules from the plurality of rules that apply to the received at least a first order based on the instrument;
determining whether a current time is within normal business hours for a designated time zone;
responsive to determining that the current time is within normal business hours for the designated time zone, processing, by the exchange simulator, the received at least a first order based on the identified one or more rules, wherein the processing comprises:
filling at least a portion of the order when the identified one or more rules define that the received at least a first order should be filled; and
not filling the order when the identified one or more rules define that the received at least a first order should not be filled;
generating, by the exchange simulator, a response in the first messaging protocol;
transforming, by the server, the response from the first messaging protocol to the received messaging protocol of the respective order; and
routing, from the server to the client, the generated response.

2. The method of claim 1, wherein the received plurality of rules comprise at least one of a fill rule, a reject rule, a cancel rule, a no acknowledgment rule, and a market data rule.

3. The method of claim 1, wherein not filling the order further comprises:
determining that the identified one or more rules comprises a reject rule; and
not filling the order based on the reject rule.

4. The method of claim 1, wherein the received at least a first order comprises a quantity.

5. The method of claim 4, wherein filling at least a portion of the order further comprises:
determining, based on the instrument and quantity for the order, that the identified one or more rules define a quantity to be filled for the order; and
filling the defined quantity for the order.

6. The method of claim 4,
wherein the defined quantity is less than the quantity for the order, and
wherein filing the defined quantity further comprises not filling a difference between the defined quantity and the quantity for the order.

7. The method of claim 4, wherein one of the identified one or more rules comprises a market data rule that defines a price and a variance for the instrument for the order.

8. The method of claim 4, wherein a price for the instrument for the order is based on a price polled from a live exchange.

9. The method of claim 1, wherein the plurality of received rules configure the exchange simulator to simulate hours of operation for an exchange located in the designated time zone.

10. The method of claim 9, wherein the order is not filled based on the order being received at a time outside of the hours of operation.

11. A system comprising:
at least one client computing device having at least a first processor and a first memory;
an exchange simulator having at least a second processor and at least a second memory, the exchange simulator further including:
a server configured to:
receive, from the at least one client computing device, a plurality of orders, each order of the plurality of orders being received via a different messaging protocol;
transform the received plurality of orders from a received messaging protocol of a respective order to a first messaging protocol different from the received messaging protocol of the respective order, the first messaging protocol being a proprietary messaging protocol used by the exchange simulator;
a rules engine configured to:
receive a plurality of rules, wherein the rules comprise rules to process the received plurality of orders;
store the plurality of rules;
the exchange simulator configured to:
receive at least a first order from the server, wherein the at least a first order comprises a stock exchange order that includes an instrument;
determine one or more rules from the rules engine that apply to the received at least a first order based on the instrument;
determine whether a current time is within normal business hours for a designated time zone;
responsive to determining that the current time is within normal business hours for the designated time zone, process the received at least a first order based on the one or more determined rules, wherein the processing comprises:
filling at least a portion of the order when the one or more determined rules define that the received at least a first order should be filled; and
not filling the order when the one or more determined rules define that the received at least a first order should not be filled
generate a response in the first messaging protocol;
responsive to determining that the current time is not within normal business hours for the designated time zone, not processing the received at least a first order;
the server further configured to:
transform the generated response from the first messaging protocol to the received messaging protocol of the respective order; and
route the generated response in the received messaging protocol to the client computing device.

12. The system of claim 11, wherein the received rules comprise at least one of a fill rule, a reject rule, a cancel rule, a no acknowledgment rule, and a market data rule.

13. The system of claim 11, wherein not filling the order further comprises:
determining that one or more of the determined rules comprises a reject rule; and
not filling the order based on the reject rule.

14. The system of claim 11, wherein the received order comprises an instrument and a quantity.

15. The system of claim 14, wherein filling at least a portion of the order further comprises:
determining, based on the instrument and quantity for the order, that one or more of the determined rules define a quantity to be filled for the order; and
filling the defined quantity for the order.

16. The system of claim 14,
wherein the defined quantity is less than the quantity for the order, and
wherein filing the defined quantity further comprises not filling the difference between the defined quantity and the quantity for the order.

17. The system of claim 14, wherein one of the determined rules comprises a market data rule that defines a price and a variance for the instrument for the order.

18. The system of claim 14, wherein a price for the instrument for the order is based on a price polled from a live exchange.

19. The system of claim 11, wherein the plurality of received rules configure the exchange simulator to simulate hours of operation for an exchange located in the designated time zone.

20. One or more non-transitory computer readable media having stored thereon instructions that, when executed by a processor of an exchange simulator, cause the exchange simulator to:
receive a plurality of rules, wherein the rules comprise rules to process orders received at the exchange simulator;
store, by a rules engine of the exchange simulator, the plurality of rules;
receive, via a server, a plurality of orders from a client, each order of the plurality of orders being received via a different messaging protocol, wherein at least a first order of the plurality of orders comprises a stock exchange order that includes an instrument;
transforming, by the server, the received plurality of orders from a received messaging protocol of a respective order to a first messaging protocol different from the received messaging protocol of the respective order, the first messaging protocol being a proprietary messaging protocol used by the exchange simulator;
identifying, by the rules engine, one or more rules from the plurality of rules that apply to the received at least a first order based on the instrument;
determining whether a current time is within normal business hours for a designated time zone;
responsive to determining that the current time is within normal business hours for the designated time zone, process the received at least a first order based on the one or more determined rules, wherein the processing comprises:
filling at least a portion of the order when the identified one or more rules define that the received at least a first order should be filled; and
not filling the order when the identified one or more rules define that the received at least a first order should not be filled;
generate a response in the first messaging protocol;
transform, by the server, the response from the first messaging protocol to the received messaging protocol of the respective order;
route, from the server to the client, the generated response; and responsive to determining that the current time is not within normal business hours for the designated time zone, not processing the received at least a first order.

* * * * *